United States Patent
Kim (10) Patent No.: US 9,380,209 B2
(45) Date of Patent: Jun. 28, 2016

(54) APPARATUS HAVING CAMERA AND METHOD FOR IMAGE PHOTOGRAPHING

(71) Applicant: Samsung Electronics Co., Ltd., Suwon-si, Gyeonggi-do (KR)

(72) Inventor: Kyunghwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/136,442

(22) Filed: Dec. 20, 2013

(65) Prior Publication Data
US 2014/0184849 A1 Jul. 3, 2014

(30) Foreign Application Priority Data
Jan. 3, 2013 (KR) .................. 10-2013-0000462

(51) Int. Cl.
H04N 5/232 (2006.01)

(52) U.S. Cl.
CPC ....... H04N 5/23245 (2013.01); H04N 5/23219 (2013.01); H04N 5/23222 (2013.01)

(58) Field of Classification Search
CPC .......... H04N 5/23245; H04N 5/23222; H04N 5/23219
See application file for complete search history.

(56) References Cited

U.S. PATENT DOCUMENTS

| | | | |
|---|---|---|---|
| 2006/0066732 A1* | 3/2006 | Heymann | 348/231.4 |
| 2006/0256396 A1* | 11/2006 | Ejima et al. | 358/448 |
| 2008/0273097 A1* | 11/2008 | Nagashima | H04N 5/23219 348/231.99 |
| 2009/0225173 A1* | 9/2009 | Ogawa | 348/207.99 |
| 2010/0277599 A1* | 11/2010 | Nozaki et al. | 348/207.1 |
| 2011/0043651 A1* | 2/2011 | Nonaka et al. | 348/220.1 |
| 2011/0216222 A1* | 9/2011 | Niyagawa et al. | 348/231.99 |
| 2011/0249961 A1* | 10/2011 | Brunner | H04N 5/23216 396/213 |
| 2012/0033958 A1* | 2/2012 | Ishida | G03B 9/58 396/153 |
| 2013/0100329 A1* | 4/2013 | Kojima et al. | 348/333.01 |
| 2013/0176458 A1* | 7/2013 | Van Dalen | H04N 5/232 348/231.99 |

* cited by examiner

Primary Examiner — Jason Flohre
(74) Attorney, Agent, or Firm — Jefferson IP Law, LLP (57) ABSTRACT

A method for image photographing in an apparatus having a camera, according to the present disclosure is provided. The method includes identifying a face area by focusing on a subject in an automatic shot mode, automatically and continuously shooting the subject if the identified face area is directed to the front toward the camera, setting a best photo by generating and displaying thumbnails of the continuously shot images of the subject, and by displaying an identifier on a thumbnail of at least one image satisfying a predetermined condition, and by displaying an identifier on a thumbnail of image satisfying a predetermined condition, and storing the at least one image satisfying the predetermined condition if storing of images is requested.

15 Claims, 9 Drawing Sheets

APPARATUS HAVING CAMERA AND METHOD FOR IMAGE PHOTOGRAPHING

CROSS-REFERENCE TO RELATED APPLICATION(S)

This application claims the benefit under 35 U.S.C. §119 (a) of a Korean patent application filed on Jan. 3, 2013 in the Korean Intellectual Property Office and assigned Serial No. 10-2013-0000462, the entire disclosure of which is hereby incorporated by reference.

TECHNICAL FIELD

The present disclosure relates to an apparatus having a camera and a method for photographing an image. More particularly, the present disclosure relates to an image photographing apparatus for a portable terminal having a camera and a method thereof, enabling continuous photographing by automatically detecting the movement of a subject.

BACKGROUND

Generally, when photographing a subject such as a baby or an animal, it is difficult to desirably compose the subject, because the subject doesn't follow a photographer's intention. The subject such as a baby or an animal frequently moves and doesn't maintain a steady posture for a certain time. Therefore, it is difficult to obtain an image of a subject facing the front when photographing the subject such as a baby or an animal, and blurred images often result.

Accordingly, a photographing method for obtaining an image facing the front without blurring is desired for photographing a subject moving frequently and not maintaining a steady posture.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure discloses an apparatus and a method for photographing a subject moving like a baby or animal in a camera device and a portable terminal having a camera.

In an embodiment of the present disclosure, an apparatus having a camera performs face recognition of a subject in an automatic photographing mode and automatically and continuously photographs the subject if the subject faces the front. Further, the camera device and portable terminal having a camera displays thumbnails of continuously photographed images, and displays a thumbnail corresponding to a desired condition so that a user may select it.

In accordance with an aspect of the present disclosure, a method for photographing an image in an apparatus having a camera is provided. The method includes identifying a face area by focusing on a subject in an automatic shot mode, automatically and continuously shooting the subject if the identified face area is directed to the front toward the camera, setting a best photo by generating and displaying thumbnails of the continuously shot images of the subject, and by displaying an identifier on a thumbnail of at least one image satisfying a predetermined condition, and storing the at least one image satisfying the predetermined condition if storing of images is requested.

Here, the predetermined condition is blurring and facing the front of the subject, and the setting a best photo is performed if the image is not blurred and the subject faces the front, and displays an identifier on a corresponding thumbnail.

In accordance with an aspect of the present disclosure, an apparatus for photographing an image is provided. The apparatus includes a camera configured to continuously photograph by focusing on a subject in an automatic shot mode, an input unit configured to generate a signal for the automatic shot mode and a request signal for storing the image, a control unit configured to control the camera in a burst shot mode if a signal for the automatic shot mode is detected and a face area of the subject in an image received from the camera is directed to the front toward the camera, and to buffer and generate thumbnails for images photographed in the burst shot mode, a display unit configured to display the thumbnail under the control of the control unit, and to display an identifier on the thumbnail corresponding to at least one image satisfying a predetermined condition set by the control of the control unit, and a storage unit configured to store the at least one image satisfying the predetermined condition set by the control of the control unit if a signal requesting storing of the at least one image is detected.

In the camera device or portable terminal having a camera according to the present disclosure, a subject moving like a baby or an animal can be effectively photographed by identifying a face area of a subject being focused in an automatic shot mode (for example, a pet shot mode), and by automatically and continuously photographing the subject if the face area of subject is directed to the front. Further, the camera device or portable terminal having a camera according to an embodiment of the present disclosure may display images satisfying a predetermined condition (for example, existence of blurring and whether the subject faces the front) as best photos by analyzing the photographed images, and may store the best photos if requested.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure discloses an apparatus and a method for photographing a subject frequently moving like a baby or an animal in a camera device and a portable terminal having a camera. A camera device according to an embodiment of the present disclosure provides an automatic shot mode to photograph a subject frequently moving. Hereinafter, a subject frequently moving and not maintaining a steady posture like a baby or an animal is referred to as a pet, and a mode for photographing a pet is referred to as a pet shot mode. Further, the following description is made based on the camera device.

If the pet shot mode is set to on, the camera device detects a face area of a subject by automatically focusing on the subject. If the face of the subject is identified to be directed to the front, the camera device continuously photographs the subject, and displays continuously photographed images as thumbnails. When displaying the thumbnails, thumbnails corresponding to images satisfying a predetermined condition may be displayed separately. Here, the predetermined condition may be identifying a blurring and facing the front of the subject.

Figure 1:
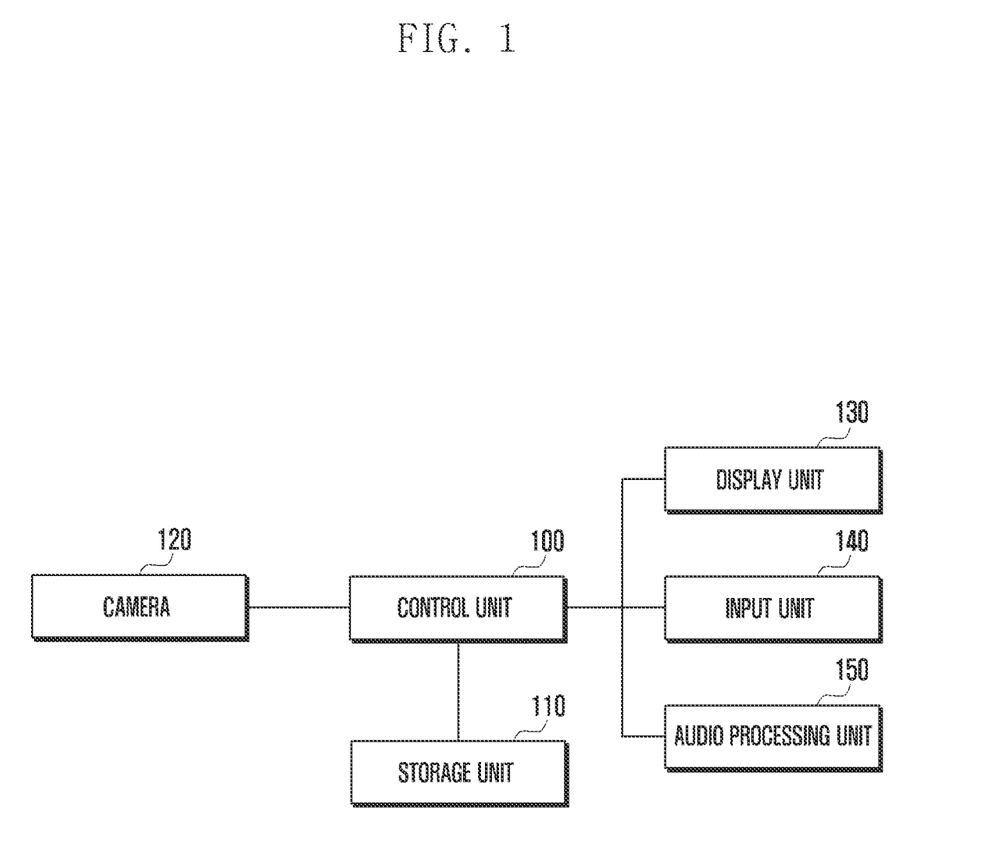
FIG. 1 is a block diagram showing a configuration of a camera device according to an embodiment of the present disclosure.

FIG. 1 is a block diagram showing a configuration of a camera device according to an embodiment of the present disclosure.

Referring to FIG. 1, a control unit 100 controls the general operation of the camera device. Further, the control unit 100 controls a pet shot mode. In the pet shot mode, the control unit 100 detects a face area of a subject by automatically focusing on the subject, and if the detected face area is identified to be directed to the front, controls to continuously photograph the subject with a predetermined frame number for a predetermined time and displays the continuously photographed image with a thumbnail.

A camera 120 photographs a subject in a photographing mode set by the control unit 100, and photographs the subject with a continuous shot or a single shot (e.g., still image) under the control of the control unit 100 in a pet shot mode.

A storage unit 110 may have a program memory storing an operating program of the camera and a program according to an embodiment of the present disclosure, and a data memory storing photographed images.

A display unit 130 displays an image photographed under the control of the control unit 100. The display unit 130 may be configured with a Liquid Crystal Display (LCD) or Organic Light Emitting Diode (OLED).

An input unit 140 generates signals for controlling a photographing operation of the camera. Here, the display unit 130 and the input unit 140 may be integrated into a touch screen.

An audio processing unit 150 outputs a predetermined sound under the control of the control unit 100 in a pet shot mode.

The camera device having the above configuration provides a pet shot mode. Further, the control unit 100 may provide a face recognition function detecting a face area of the subject (e.g., a pet). The face recognition function between a human and an animal may be different, and the animals may have different types of face. In the embodiment of the present disclosure, a face recognizer of the control unit 100 identifies eyes and a nose, and may perform a function of extracting a face area of the subject by using color differences between a surrounding area and the face area. The face recognizer identifies a face area of the subject in the pet shot mode, and the control unit 100 decides whether the pet faces the front, based on the identification result of the face recognizer. Further, in the pet shot mode, a user may select a single shot mode photographing a frame of still image or a burst shot mode photographing a predetermined number of frames for a predetermined time. Here, photographing in the burst shot mode of the pet shot mode may be performed differently from a general burst shot mode. For example, the burst shot mode of the pet shot mode may use a longer time and a lesser number of frames compared to the general burst shot mode.

Further, a sound may be used to attract a subject's attention in the pet shot mode. For this, the storage unit 110 stores at least one sound, and a sound button is displayed in a screen of the display unit 130 in the pet shot mode. If the user touches the sound button displayed in the display unit 130 in the pet shot mode, the control unit 100 detects it, and controls the audio processing unit 150 to play a sound corresponding to a selected sound button by accessing the storage unit 110. Here, the sound may be stored in the storage unit 110 as a default during the production process of the camera device or stored by the user in a setting mode. The sound may include sounds of a puppy, a vacuum cleaner, a cat, a frog, and a bird.

In the pet shot mode, if the user aims the camera 120 at the subject, the control unit 100 identifies a face area of the subject by automatically focusing in the pet shot mode. At this moment, the control unit 100 sets an auto-exposure in the center of the face. This is to adjust an exposure value so that the colors of surroundings centered by the face become expressed in the best condition. If the subject is identified to be directed to the front by analyzing the identified face area, the control unit 100 controls the camera 120 to automatically photograph the subject. Namely, if the subject is identified to be directed to the front in the pet shot mode, the control unit 100 controls to automatically photograph the subject without an input of the shutter button. Here, the photographing may be performed in a single shot mode (e.g., still image) or a burst shot mode.

In the continuous photographing mode, the control unit 100 buffers the images continuously obtained by the camera 120 in the storage unit 110 or in an internal memory of the control unit 100. The control unit 100 controls the display unit 130 to display images satisfying a predetermined condition by analyzing the buffered images and generates a thumbnail for each image to display in the display unit 130. When the thumbnail is displayed, the control unit 100 controls to display a best photo identifier on the thumbnail corresponding to the image satisfying the predetermined condition.

Figure 2:
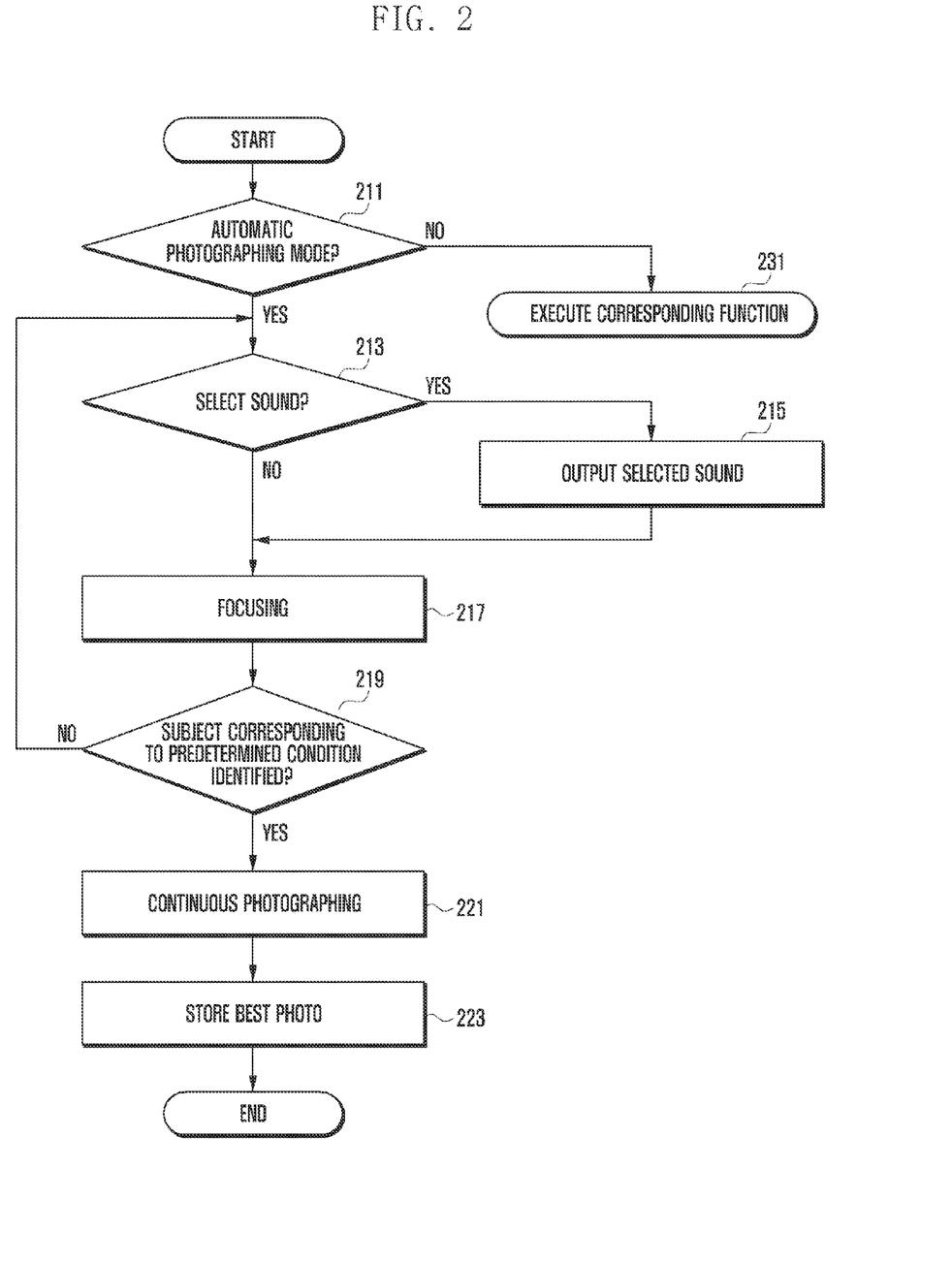
FIG. 2 is a flowchart showing a procedure of performing an automatic photographing mode according to an embodiment of the present disclosure.
Figure 3:
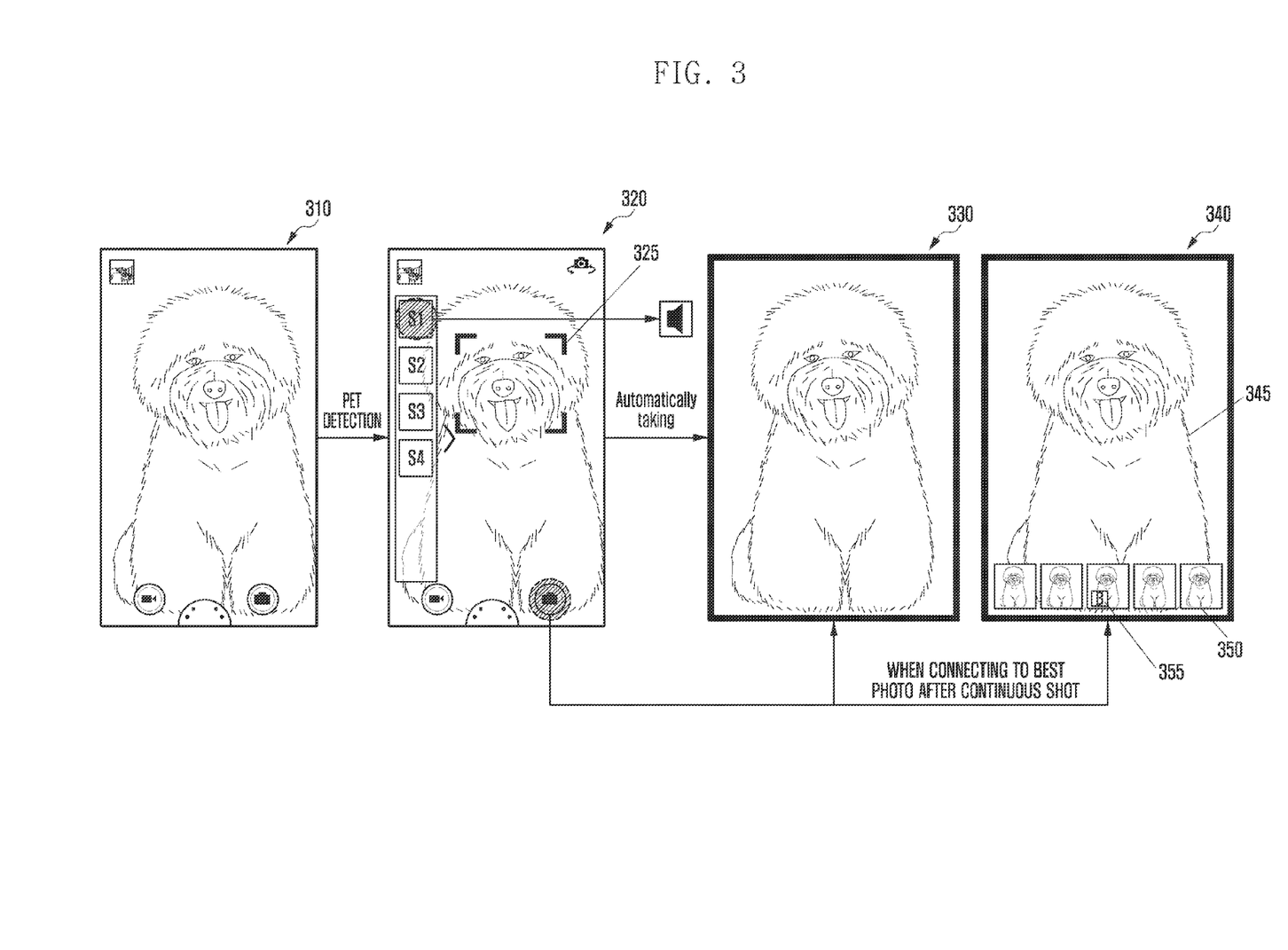
FIG. 3 is a drawing showing screen examples of processing an image in the automatic photographing mode of FIG. 2 according to an embodiment of the present disclosure.

FIG. 2 is a flowchart showing a procedure of performing an automatic photographing mode according to an embodiment of the present disclosure. FIG. 3 is a drawing showing screen examples of processing an image in the automatic photographing mode of FIG. 2 according to an embodiment of the present disclosure. Here, the automatic photographing mode is for photographing a subject frequently moving and not maintaining a steady posture, which is referred to as the pet shot mode.

Referring to FIGS. 2 and 3, if an automatic photographing mode is not selected at operation 211, the control unit 100 executes a corresponding function 231. If an automatic photographing mode is selected at operation 211, the control unit 100 performs the automatic photographing mode. At this time, a user aims the camera 120 at a subject as shown by Screen 310 of FIG. 3, after setting the automatic photographing mode. The control unit 100 then controls the camera 120 to photograph the subject, and identifies a face area of the subject as shown by 325 of Screen 320. Here, the control unit 100 sets an automatic exposure value to photograph the face area of subject. In the automatic photographing mode, the control unit 100 controls the display unit 130 to display an image obtained by the camera 120 and to display sound buttons S1 to S4 as shown by Screen 320 of FIG. 3. The sound buttons S1 to S4 are used to output a corresponding sound to attract the subject's attention in the automatic photographing mode. If a sound button is selected at operation 213, the control unit 100 outputs a sound through the audio processing unit 150 by accessing the sound corresponding to the selected sound button at operation 215.

In the above state, the control unit 100 identifies a face area by focusing on the subject at operation 217. If the face of the subject is identified to be directed to the front (i.e., if the subject looks at the camera) as shown by 325 of Screen 320 in FIG. 3, the control unit 100 detects it and automatically takes an image as shown by Screen 330 of FIG. 3 at operation 219. Here, photographing the subject may use a method of burst shooting. Namely, the control unit 100 automatically focuses on the subject in the automatic photographing mode, and if the subject looks at the camera 120, the control unit 100 automatically and continuously photographs the subject by controlling the camera 120 at operation 221.

Subsequently, the control unit 100 buffers the continuously obtained images, and controls the display unit 130 to display images satisfying a predetermined condition by analyzing the images and to display thumbnails of the obtained images at the bottom area of the display unit 130 at operation 223. Here, the control unit 100 controls to display images satisfying a predetermined condition (or images closest to the predetermined condition) in the display unit 130 and to display thumbnails of the continuously obtained images in the bottom area 350 of the image 345. A best photo identifier is displayed on the thumbnail of the image satisfying the predetermined condition among the obtained images as shown by 355. Here, the control unit 100 decides a subject image facing the front and not blurred as a best photo.

Storing the obtained images may be performed in various methods. For example, the control unit 100 may automatically store images displayed as best photos among the thumbnails or store the best photo images if a save button is pressed. Alternatively, the user may select thumbnails of desired images and store the images corresponding to the selected thumbnails by touching the save button.

Figure 4:
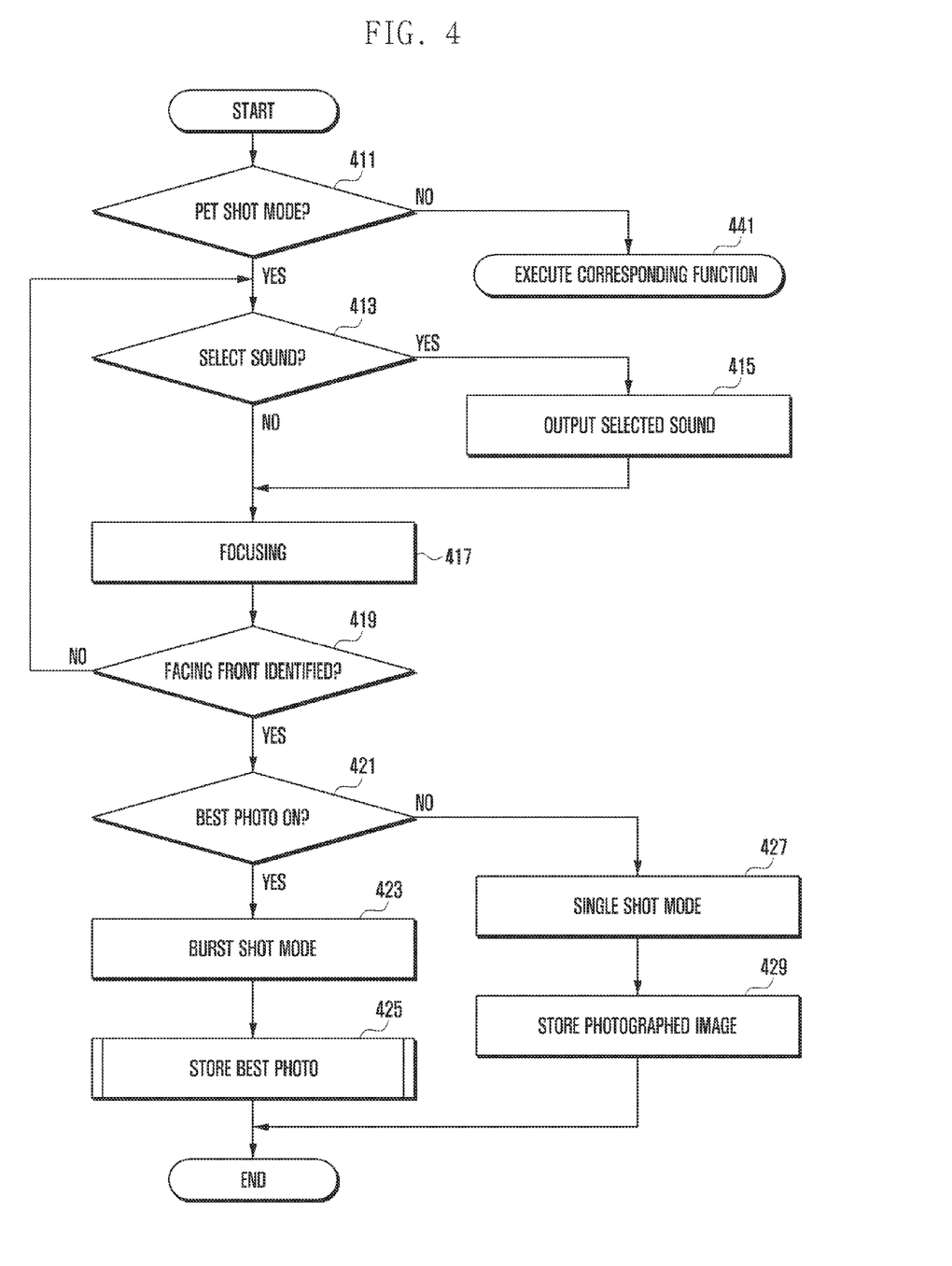
FIG. 4 is a flowchart showing a procedure of performing a pet shot mode in a camera device according to an embodiment of the present disclosure.
Figure 5:
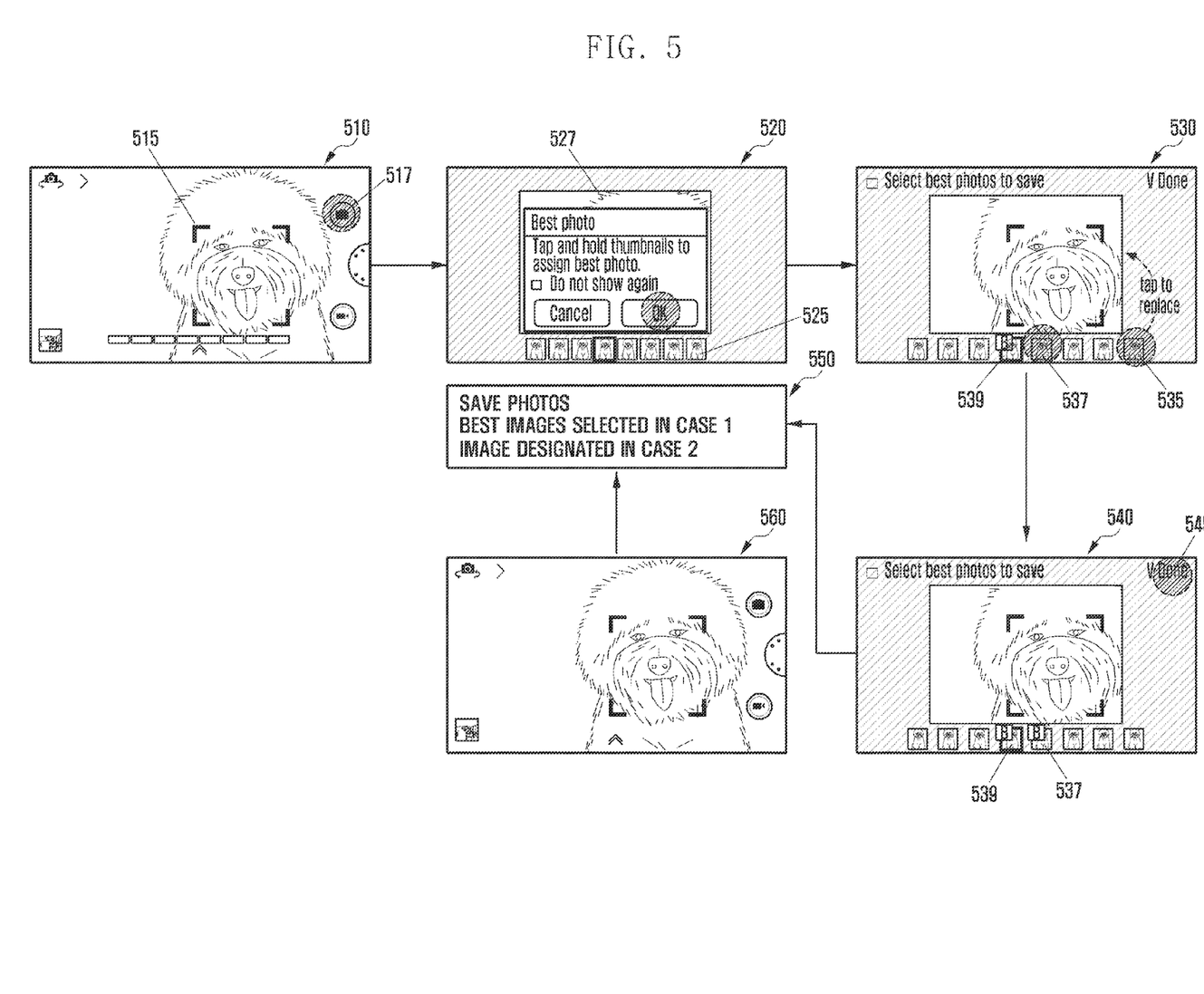
FIG. 5 is a drawing showing screen examples displayed in the pet shot mode of FIG. 4 according to an embodiment of the present disclosure.

FIG. 4 is a flowchart showing a procedure of performing a pet shot mode in a camera device according to an embodiment of the present disclosure. FIG. 5 is a drawing showing screen examples displayed in the pet shot mode of FIG. 4 according to an embodiment of the present disclosure.

Referring to FIGS. 4 and 5, the control unit 100 may set a pet shot mode as a photographing method according to a user's selection. If a best photo mode is set to on in the pet shot mode, the control unit 100 continuously photographs a subject (e.g., burst shot) in the pet shot mode, and if the best photo mode is set to off, the control unit 100 photographs a subject as a still image (e.g., single shot) in the pet shot mode. Further, a sound may be used to attract a subject's attention in the pet shot mode. For this, the storage unit 110 stores at least one sound, and the control unit 100 controls the display unit 130 to display a sound button in a screen for outputting the sound in the pet shot mode. Here, the sound may be stored in the storage unit 110 as a default during the production process of the camera device or stored by the user in a setting mode. The sound may include sounds of a puppy, a vacuum cleaner, a cat, a frog, and a bird.

In the above state, if a pet shot mode is not selected at operation 411, the control unit 100 executes a corresponding function 441. If the user selects a pet shot mode, the control unit 100 detects the selection and performs the pet shot mode at operation 411. The pet shot mode is a mode for automatically photographing a subject without using a shutter button if the subject is focused and a predetermined condition is met while the user aims the camera 120 at the subject. The control unit 100 then controls the camera 120 to photograph the subject, and identifies a face area of the subject obtained by the camera 120. While performing the pet shot mode, the control unit 100 may control to display sound buttons S1 to S4 and a camera button 517 as shown in Screen 510 of FIG. 5. If the user selects a sound button, the control unit 100 detects the selection at operation 413, and controls the audio processing unit 150 to play a sound corresponding to the selected sound button by accessing the storage unit 110 at operation 415. Accordingly, the camera 120 automatically focuses on the subject in the pet shot mode at operation 417, and the control unit 100 identifies a face of the image obtained by the camera 120. If a sound button is selected in a state of controlling the focusing and recognizing a face of subject as described the above (i.e., pet shot mode), the control unit controls to play the selected sound. At this moment, if the subject faces the camera 120 by turning its head, the control unit 100 identifies a frontal face of the subject at operation 419.

If the focusing area 515 of Screen 510 in FIG. 5 aims at a frontal face of subject, the control unit 100 detects it at operation 419, and checks whether a best photo mode is set to on (i.e., burst shot mode) at operation 421. If the best photo mode is set to on, the control unit 100 detects it at operation 421, and controls the camera 120 to operate in a burst shot mode at operation 423, and buffers images obtained by the camera 120. The control unit 100 then sets best photos by analyzing the obtained images, and stores the best photos in the storage unit 110 at operation 425.

The operation of the control unit 100 deciding and storing a best photo in operation 425 will be described in more detail. After the burst shot, the control unit 100 generates thumbnails of the photographed images and controls the display unit 130 to display as shown by 525 in FIG. 5. The control unit 100 then controls the display unit 130 to display information ("Tap and hold thumbnails to assign best photo") for setting a best photo identifier as a popup window as shown in Screen 527. If the user selects "OK", the control unit 100 controls to display an identifier (in Screen 530, thumbnails of the best photo may be 537 and 539) on the thumbnail corresponding to a best photo image by analyzing the buffered images. If a thumbnail is selected, the control unit 100 controls to display an image corresponding to the selected thumbnail as a main image as shown by 533 of Screen 530. If the thumbnail 535 is tapped in Screen 530 of FIG. 5, the main image 533 is replaced with an image corresponding to the thumbnail 535 ("Tap to replace"). In a state of displaying a best photo as described above, if the user selects a save button (in Screen 540 of FIG. 5, a done button 545 may operate as a save button), the control unit 100 stores best photos set in Screen 550 (in Screen 540 of FIG. 5, images corresponding to the thumbnails 537 and 539) and images selected by the user.

At this time, the popup window displayed in the Screen 520 may be omitted. In this case, the control unit 100 may skip Screen 520 and display the Screen 530 instead. Namely, the control unit 100 buffers obtained images while performing continuous photographing in the pet shooting mode, generates and displays thumbnails of the obtained images, decides best photos satisfying a predetermined condition by analyzing the buffered images, and displays identifiers on the thumbnails corresponding to the decided best photos. Here, the condition of the best photo may be blurring and facing the front of the subject, and a higher priority may be given to the blurring of the image.

Further, when in the pet shoot mode, if the best photos are set to off and the subject faces the front, the control unit 100 photographs a still image in the single shot mode by driving the camera 120 at operation 427, and stores the still image photographed as shown in Screen 560 at operation 429. Namely, if the burst shot mode (i.e., continuous photographing) is not set in the pet shot mode, the control unit 100 automatically photographs at the moment of the subject facing the front, and only one frame of still image is obtained.

The photographing method with the best photo mode off may be performed by automatically photographing with face recognition or by manually photographing with a shutter button. Namely, in the pet shot mode, the control unit 100 controls the display unit 130 to display a shutter button 517 as shown in Screen 510 of FIG. 5, and photographs the subject if the shutter button 517 is touched. If touching the shutter button is detected in the pet shot mode, the control unit 100 photographs the subject at the corresponding time.

Figure 6:
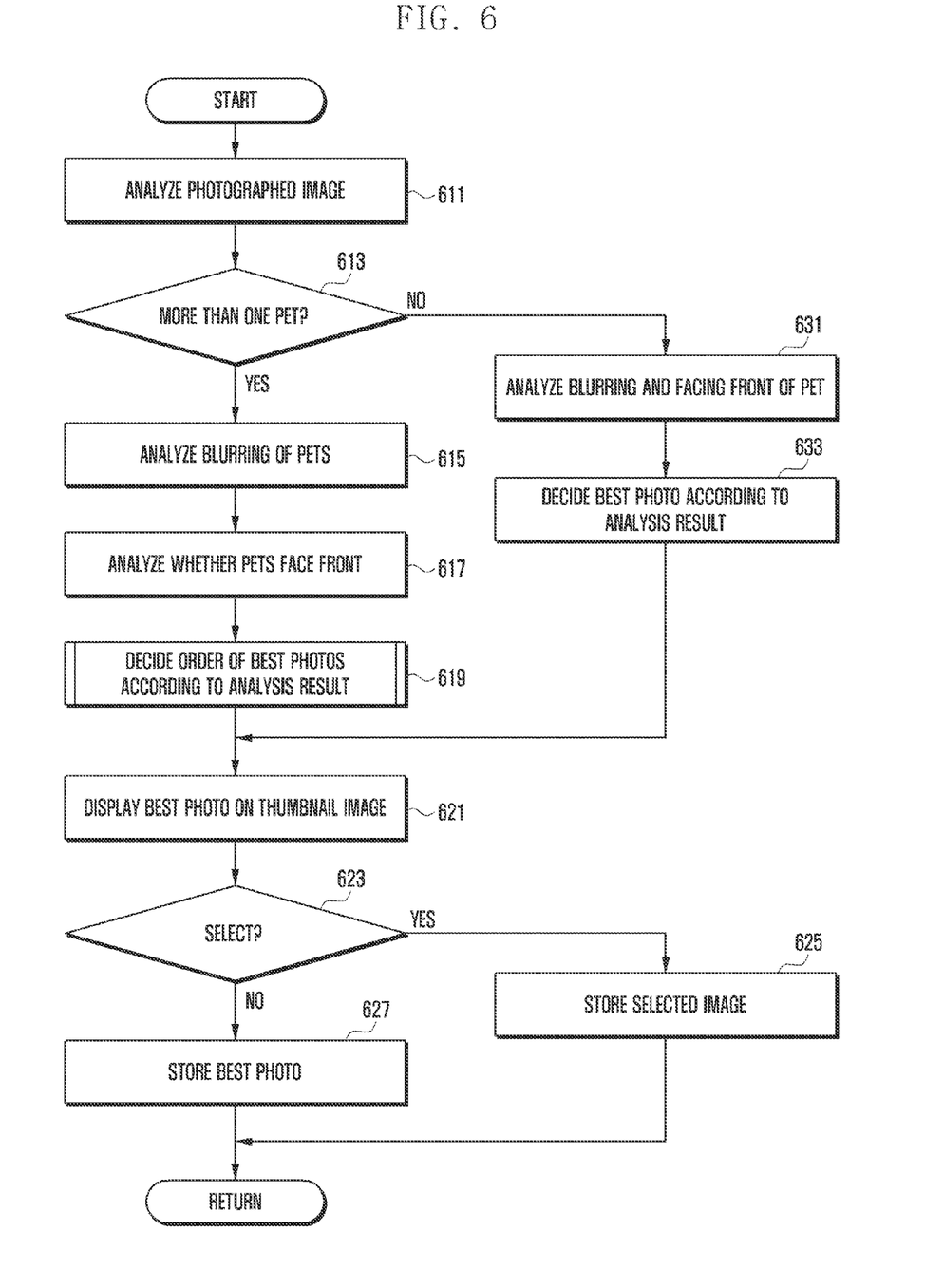
FIG. 6 is a flowchart showing a procedure of setting best photos of FIG. 5 according to an embodiment of the present disclosure.
Figure 7A:
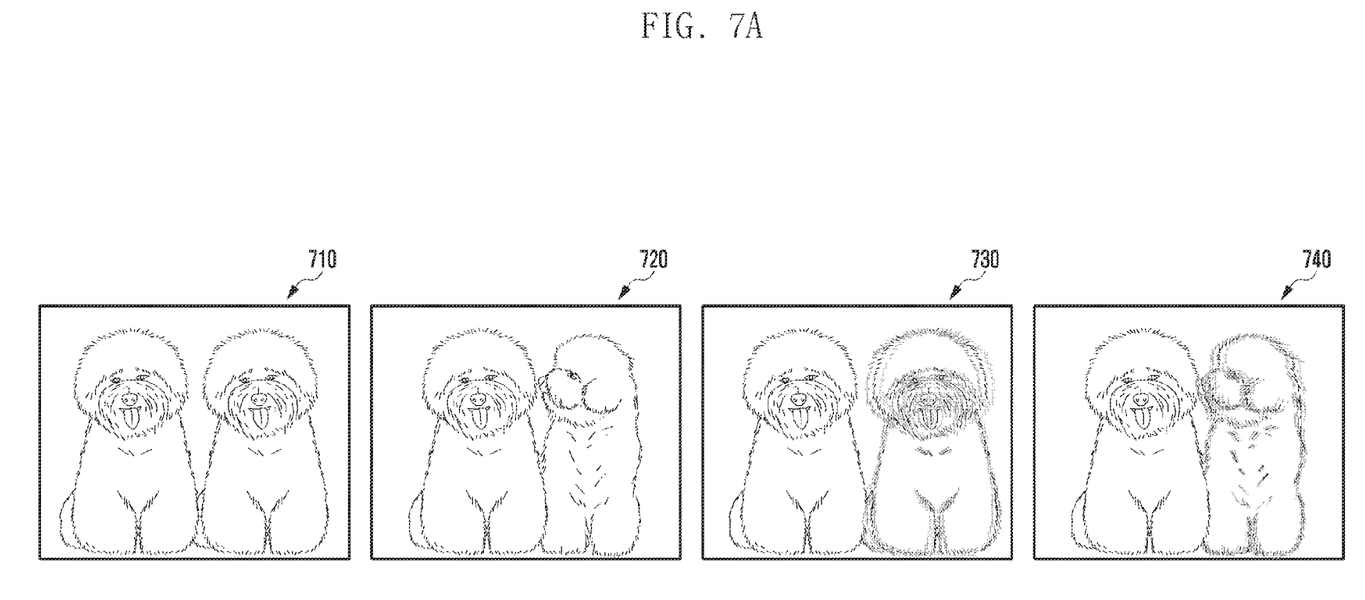
FIGS. 7A and 7B are drawings showing examples of setting the best photos according to an embodiment of the present disclosure.
Figure 7B:
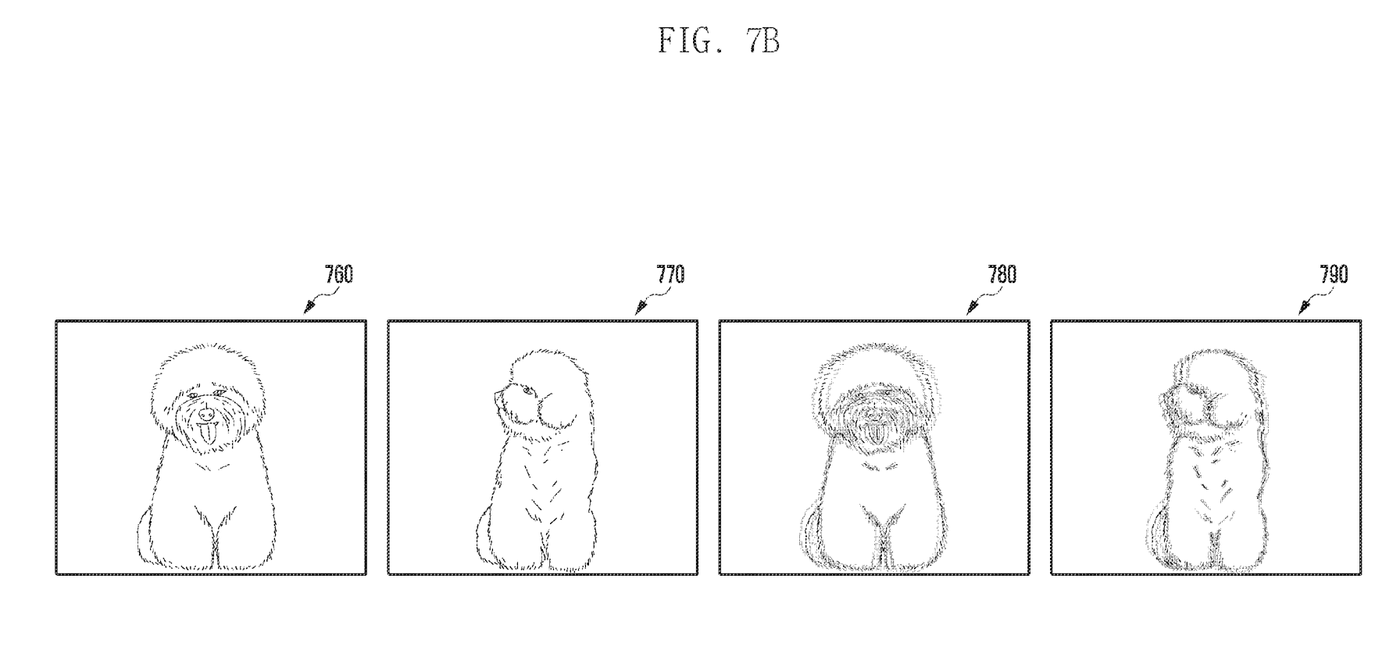

FIG. 6 is a flowchart showing a procedure of setting best photos of FIG. 5 according to an embodiment of the present disclosure. FIGS. 7A and 7B are drawings showing examples of setting the best photos according to an embodiment of the present disclosure.

Referring to FIGS. 6, 7A, and 7B, the control unit 100 analyzes face areas of burst shot images in the pet shot mode at operation 611. In the analyzing process, the control unit 100 checks the number of detected face areas and whether any of the detected face areas is directed to the front. The control unit 100 may analyze eyes, nose and/or mouth of the subject, and regards the subject as facing the front if two eyes and a nose are detected.

If more than one subject is detected, the control unit 100 identifies this at operation 613, analyzes whether a blurred image exists at operation 615, and analyzes whether a subject in an image faces the front at operation 617. The control unit 100 performs the analysis of operations 615 and 617 for all the buffered images. Subsequently, the control unit 100 sets a priority of each image according to the blurring and facing the front, and sets an image of no blurring and facing the front as a best photo at operation 619. FIG. 7A shows examples of an image having 2 animals. In FIG. 7A, Screen 710 shows an example of image in which images of both of the two animals are not blurred and face the front. Screen 720 shows another example of an image in which both of the two animals are not blurred and only one animal faces the front. Screen 730 shows another example of an image in which only one animal is not blurred and faces the front but the other one is blurred. Screen 740 shows another example of an image in which one animal faces the side and the other one is blurred. As described above, if the subject has a plurality of animals, an image may be photographed in various conditions. Table 1 shows an example of setting priorities in the case of an image having two animals.

TABLE 1

| ranking | case |
| --- | --- |
| 1 | Image of 2 animals not blurred and facing front |
| 2 | Image of 2 animals not blurred and not facing front |
| 3 | Image of 2 animals blurred and facing front |
| 4 | Image of 1 animal blurred and facing front |
| 5 | Image of 1 animal blurred and not facing front |
| 6 | Image of 2 animals blurred and facing front |
| 7 | Image of 2 animals blurred and not facing front |

Referring to Table 1, the control unit 100 may set an image of ranking 1 (both of the two animals are not blurred and face the front) as a best photo. The image of ranking 2 corresponds to an image in which both of the two animals are not blurred but a portion of one of the animals does not face the front, which may also be set as a best photo.

If the subject has only one animal, the control unit 100 analyzes whether the subject is blurred and faces the front in operation 631, and sets a priority of images according to blurring and facing the front in operation 633. In this case, Screen 760 of FIG. 7B shows an image of an animal not blurred and facing the front. Screen 770 shows an image of an animal not blurred and not facing the front. Screen 780 shows an image of an animal blurred and facing the front. Screen 790 shows an image of an animal blurred and not facing the front. Table 2 shows an example of setting priorities in the case of image having only one animal

TABLE 2

| ranking | case |
| --- | --- |
| 1 | Image of not blurred and facing front |
| 2 | Image of not blurred and not facing front |
| 3 | Image of blurred and facing front |
| 4 | Image of blurred and not facing front |

Referring to Table 2, the control unit 100 may set an image of ranking 1 (not blurred and facing the front) as a best photo. An image of ranking 2 corresponds to an image of an animal not blurred and not facing the fronts, which may also be set as a best photo.

After deciding the priorities and best photos by analyzing the continuously photographed images, the control unit 100 controls to display a best photo identifier on a thumbnail image at operation 621. Here, the user may also store an image not set to the best photo. In this case, the user may select a corresponding thumbnail, and may also eliminate a best photo identifier for undesirable images among the best photos. Accordingly, if the user selects a thumbnail, the control unit 100 detects the selection and controls to display selection on the thumbnail at operation 623, and stores images corresponding to the selected thumbnail if storing the images is requested at operation 625. However, if the user requests the storing without selection of thumbnail, the control unit 100 detects it at operation 623, and stores the best photos at operation 627.

As described above, the pet shot mode according to the embodiment of the present disclosure obtains a plurality of images by automatically performing a burst shot at the time of a pet facing the camera. Accordingly, even in case of photographing an animal (or baby) frequently moving, best photos can be desirably photographed. Further, a sound may be output while photographing, and thereby pet photographing resulting a natural look can be performed by attracting an animal's attention.

Figure 8:
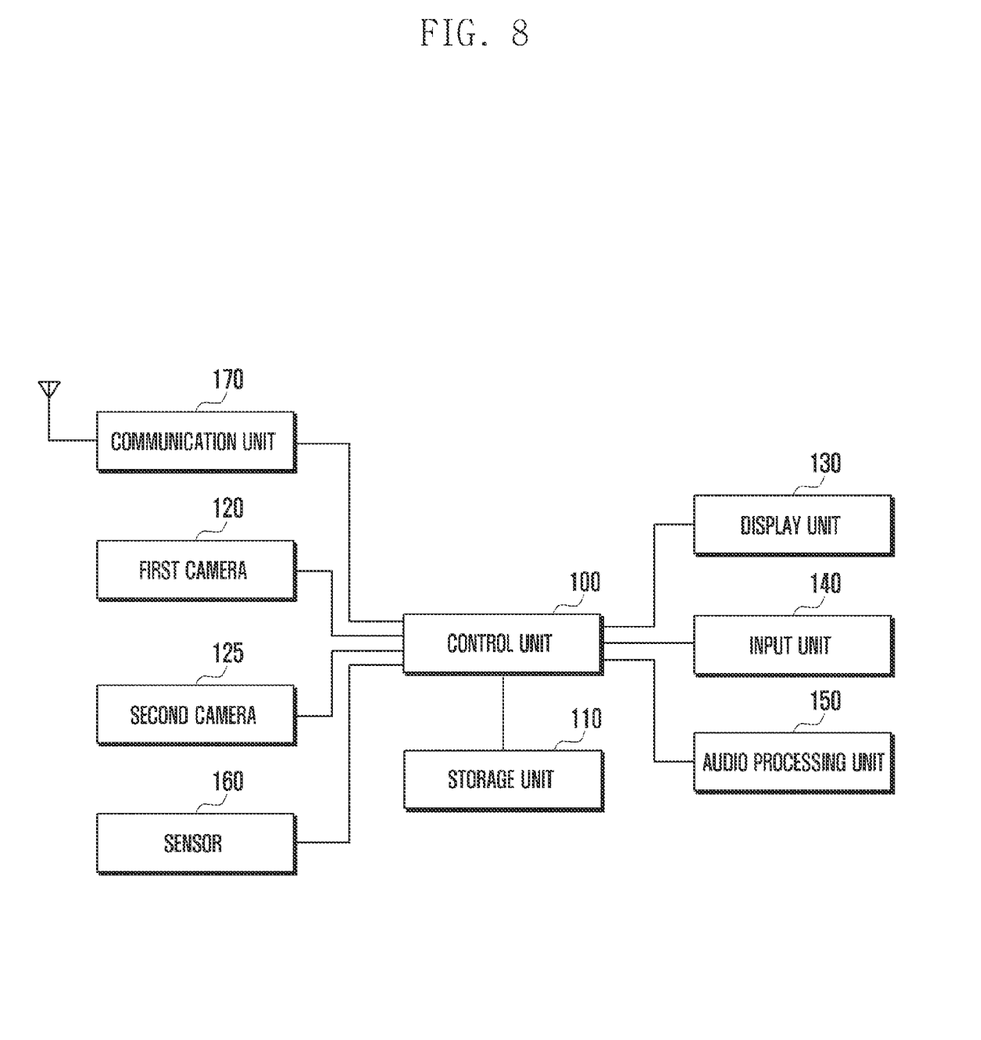
FIG. 8 is a block diagram showing a configuration of a portable terminal performing a photographing operation according to an embodiment of the present disclosure.

FIG. 8 is a block diagram showing a configuration of portable terminal performing a photographing operation according to another embodiment of the present disclosure. Here, the portable terminal may be various digital equipments such as a mobile phone including a smart phone, a digital audio terminal, tablet Personal Computer (PC), and camera device.

Referring to FIG. 8, a communication unit 170 performs a wireless communication function with a base station or interne server. The communication unit 170 may be configured with a transmitter up-converting a frequency of transmitting signal and amplifying an electric power, and a receiver low-noise amplifying and down-converting a frequency of a received signal. Further, the communication unit 170 may include a modulator and a demodulator. The modulator transmits a transmitting signal to the transmitter by modulating the signal, and the demodulator demodulates a signal received through the receiver. Here, the modulator and demodulator may be a Long Term Evolution (LTE), Wideband Code Division Multiple Access (WCDMA), Global System for Mobile communications (GSM), WIFI, Wireless Broadband (WIBRO), Near Field Communication (NFC), Bluetooth, etc. In the embodiment of the present disclosure, the communication unit 170 is assumed to be configured with an LTE, WIFI, and Bluetooth devices.

A first camera 120 is a camera disposed at the rear side of the portable terminal, and may photograph a high resolution image. A second camera 125 is a camera disposed at the front side of the portable terminal, and may photograph a lower resolution image compared to the first camera.

A control unit 100 controls general operation of the portable terminal, and in a pet shot mode according to an embodiment of the present disclosure, detects a face area of subject by automatically focusing on the subject, and if the detected face area is identified to be directed to the front, controls the camera 120 to automatically perform a burst shot. Further, the control unit 100 sets best photos for a plurality of images obtained by the burst shot of camera 120, controls to display corresponding thumbnails, and controls to store the best photos if storing the images is requested.

A storage unit 110 may have a program memory storing an operating program of the portable terminal and a program according to an embodiment of the present disclosure, and a data memory storing tables for the operation of a portable terminal and data generated while executing a program. Further, under the control of the control unit 100, the storage unit 110 stores sounds to be output in a pet shot mode, output sound data, and stores best photos.

A display unit 130 displays information of an executing application under the control of the control unit 100. The display unit 130 displays buttons for pet shot mode and thumbnails of continuously photographed images under the control of the control unit 100. The display unit 130 may be configured with an LCD or OLED.

An input unit 140 may be provided with a capacitive type or resistive type touch screen, and outputs location information of a user's touch (e.g., finger touch) to the control unit 100. Further, the input unit 140 may include an Electo-Magnetic Resonance (EMR) sensor pad, and detects a pen touch input to transmit to the control unit 100. Here, the display unit 130 and the input unit 140 may be integrated into one unit.

An audio processing unit 150 processes a voice signal generated in a communication mode and outputs a sound selected in a pet shot mode under the control of the control unit 100.

A sensor 160 may include various sensors for detecting movement of the portable terminal The sensor 160 may be configured with an acceleration sensor, a geomagnetic sensor, and/or a location detection sensor.

In a portable terminal having the above configuration, a user may set a pet shot mode by using the input unit 140, and aims the camera 120 to a subject after setting the pet shot mode. The pet shot mode may be set in a case where the subject is an animal or a baby frequently moving and not looking at the camera 120. If the pet shot mode is set, the control unit 100 controls the camera 120 to operate in an automatic focusing mode and the display unit 130 to display an image obtained by the camera 120 as a preview image, and identifies whether a face area of a subject is directed to the camera 120 by analyzing the image. In the pet shot mode, the control unit 100 may control the display unit 130 to display a sound button and a shutter button in a screen. If the user selects a sound button, the control unit 100 controls the audio processing unit 150 to play a sound corresponding to the selected sound button by accessing the storage unit 110.

If the subject directly looks at the camera 120, the control unit 100 detects it and controls the camera 120 to operate in a burst shot mode from the corresponding time. The control unit 100 buffers an image obtained by the camera 120, generates a thumbnail for the buffered image to display in the display unit 130. Further, the control unit 100 decides a best photo by analyzing the buffered image. Here, the condition of best photo may be set to a subject image not being blurred and facing the front. The control unit 100 then controls to display a best photo identifier on a thumbnail corresponding to the image set to a best photo. If the user touches the thumbnail displayed in the display unit 130, the control unit 100 controls the display unit 130 to display the thumbnail of the corresponding image so that the user can identify it. If a thumbnail not having a best photo identifier is touched and held, the control unit 100 controls to display the best photo identifier on the corresponding thumbnail. Namely, the control unit 100 may additionally set an image without a best photo setting to a best photo if the user selects a thumbnail of a corresponding image.

Subsequently, if the user inputs a signal requesting to store the image through the input unit 140, the control unit 100 stores the images set to the best photo in the storage unit 110.

The method of photographing an image in an apparatus having a camera may be implemented in the form of a program command executable by various computer means and recorded in a non-transitory computer readable recording medium. In this case, the computer readable recording medium may include a program command, a data file, and a data structure individually or a combination thereof. The program command recorded in a recording medium may be specially designed or configured for exemplary embodiments of the present disclosure or be known to a person having ordinary skill in a computer software field to be used.

The computer readable recording medium includes Magnetic Media such as hard disk, floppy disk, or magnetic tape, optical media such as Compact Disc Read Only Memory (CD-ROM) or Digital Versatile Disc (DVD), magneto-optical media such as floptical disk, and a hardware device such as ROM, RAM, and flash memory storing and executing program commands. Further, the program command includes a machine language code created by a complier and a high-level language code executable by a computer using an interpreter. The foregoing hardware device may be configured to be operated as at least one software module to perform an operation of the present disclosure, and a reverse operation thereof is the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for photographing an image in an apparatus having a camera, the method comprising:
    identifying, in an automatic shot mode, a face area by focusing on a subject;
    automatically setting an exposure value based on a center of the face area;
    automatically and continuously shooting the subject, based on the automatically set exposure value, if the identified face area is directed to the front toward the camera;
    setting a best photo by generating and displaying thumbnails of the continuously shot images of the subject, and by displaying an identifier on a thumbnail of at least one image satisfying a predetermined condition; and
    storing the at least one image satisfying the predetermined condition if storing of images is requested,
    wherein the setting the best photo comprises setting the best photo by displaying the identifier on the corresponding thumbnail image occurs when the thumbnail is selected for greater than a set amount of time.

2. The method of claim 1,
    wherein the predetermined condition is blurring of the subject and facing the front of the subject, and
    wherein the setting of the best photo is performed if the subject is not blurred and the subject faces toward the front, and displays an identifier on a corresponding thumbnail.

3. The method of claim 2, further comprising:
    displaying an image on a screen corresponding to a selected thumbnail.

4. The method of claim 2, wherein the subject comprises an animal, further comprising:
    outputting a sound in the automatic shot mode.

5. The method of claim 4, wherein the outputting of the sound further comprises:
    displaying a sound button in the automatic shot mode, and playing the sound if the sound button is selected.

6. The method of claim 2, further comprising:
    setting a best photo mode to one of on and off in the automatic shot mode, and photographing a still image if the face area of the subject is identified to be directed to the front and the best photo mode is set to off.

7. The method of claim 2, further comprising:
    displaying a shutter button on a screen in the automatic shot mode, and photographing by controlling the camera if the shutter button is selected.

8. A non-transitory computer-readable storage medium storing instructions that, when executed, cause at least one processor to perform the method of claim 1.

9. An apparatus for photographing an image, the apparatus comprising:
    a camera configured to continuously photograph by focusing on a subject in an automatic shot mode;
    an input unit configured to generate a signal for the automatic shot mode and a request signal for storing the image;
    a control unit configured to:
        identify, in the automatic shot mode, a face area by focusing on the subject,
        automatically set an exposure value based on a center of the face area;
        control the camera in a burst shot mode, based on the automatically set exposure value, if a signal for the automatic shot mode is detected and the face area of the subject in an image received from the camera is directed to the front toward the camera, and
        buffer and generate thumbnails for images photographed in the burst shot mode;
    a display unit configured to:
        display the thumbnail under the control of the control unit, and
        display an identifier on the thumbnail corresponding to at least one image satisfying a predetermined condition set by the control of the control unit; and
    a storage unit configured to store the at least one image satisfying the predetermined condition set by the control of the control unit if a signal requesting storing of the at least one image is detected,
    wherein the control unit is further configured to control the display unit to display the identifier on the corresponding thumbnail image when the thumbnail is selected for greater than a set amount of time.

10. The apparatus of claim 9,
    wherein the predetermined condition is blurring of the subject and facing the front of the subject, and
    wherein the setting of the best photo is performed if the image subject is not blurred and the subject faces the front, and an identifier is displayed on a corresponding thumbnail.

11. The apparatus of claim 10, wherein the control unit is further configured to control the display unit to display an image on a screen corresponding to a selected thumbnail.

12. The apparatus of claim 10, wherein the subject comprises an animal, and the control unit is further configured to control to store a sound in a memory and play the sound by accessing sound data in a memory in the automatic shot mode.

13. The apparatus of claim 12, wherein the control unit is further configured to control the display unit to display a sound button in a screen, and to play a corresponding sound if the sound button is selected.

14. The apparatus of claim 10, wherein the control unit is further configured to:
    set a best photo mode to one of on and off in the automatic shot mode, and photograph a still image if the face area of the subject is identified to be directed to the front and the best photo mode is set to off.

15. The apparatus of claim 10, wherein the control unit is further configured to:
control the display unit to display a shutter button on a screen in the automatic shot mode, and
photograph by controlling the camera if the shutter button is selected.

* * * * *